Patented May 24, 1932

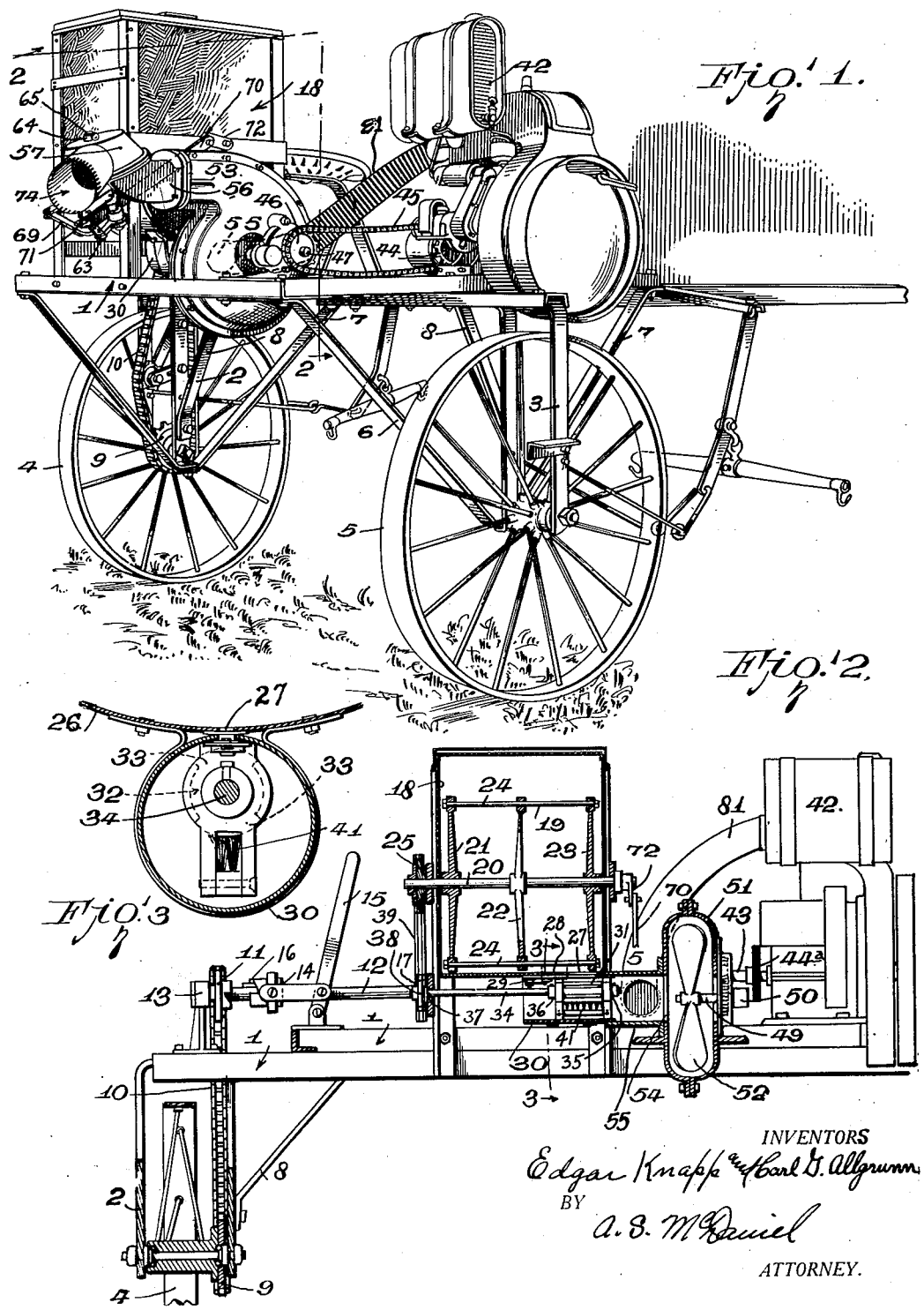

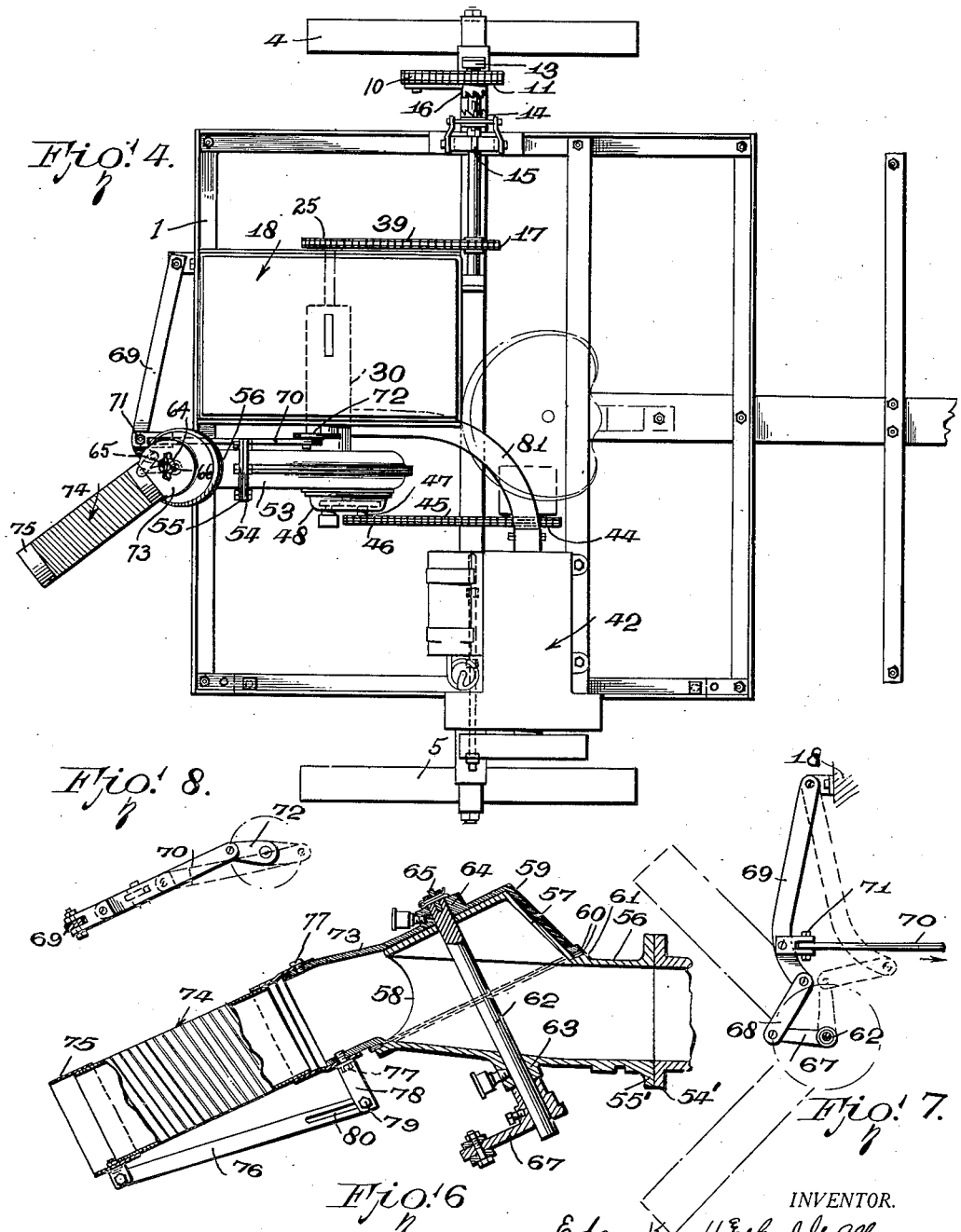

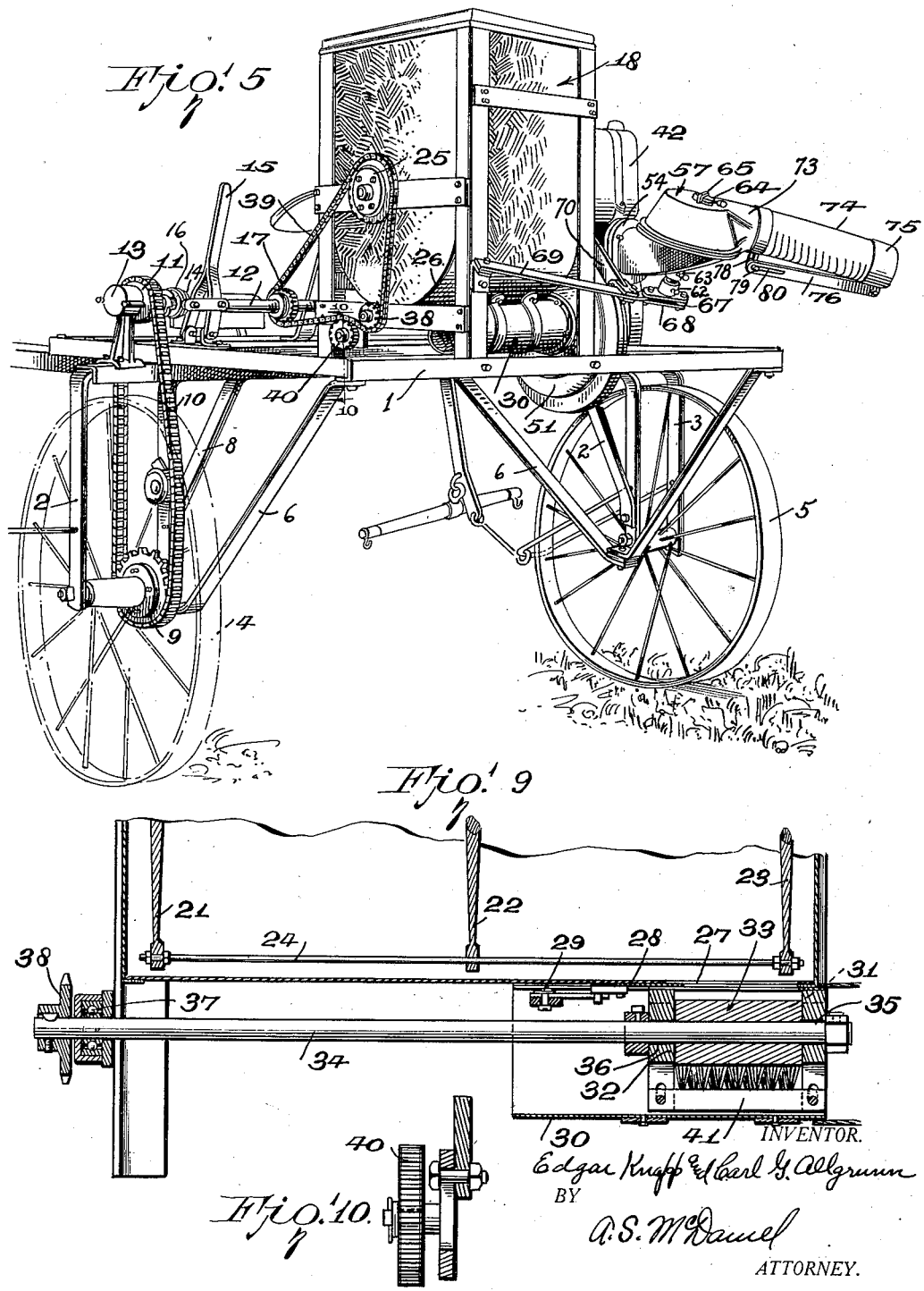

1,859,567

UNITED STATES PATENT OFFICE

EDGAR KNAPP AND CARL G. ALLGRUNN, OF MIDDLEPORT, NEW YORK, ASSIGNORS TO NIAGARA SPRAYER COMPANY, OF MIDDLEPORT, NEW YORK, A CORPORATION

DUSTING MACHINE

Application filed May 18, 1927. Serial No. 192,287.

This invention relates to a machine for distributing powders from a moving vehicle, and more particularly to a machine for distributing insecticides, fungicides and the like over the ground or over vegetation.

Insects and fungus growths have for a long time been the source of much destruction of vegetation, and the spread of insects and fungus growths has persistently increased in spite of attempts to check the same. For a number of years after insecticides and fungicides had come to be used commercially, much of the insecticidal and fungicidal material was distributed by hand, or by means of portable equipment carried by the person distributing the material, such distribution being necessarily slow and costly. Insecticides and fungicides in powdered form have been found to have many advantages over insecticides and fungicides in liquid form, but the problems encountered in the distribution of the powdered material resulted in inefficient dusting and loss of material.

Most of the machines which have been employed for distributing insecticidal and fungicidal material, have utilized stationary nozzles through which the material was discharged upon the vegetation or ground, and such constructions caused distribution of the material more or less unevenly, so that much more of the material was deposited on some portions of the vegetation or ground than was required, and at times the material was so sparingly dusted that it was practically ineffective.

The present invention contemplates the employment of a pivoted nozzle which may oscillate or rotate, the speed of movement of the nozzle being controlled according to the speed of movement of the vehicle upon which the nozzle is mounted. The invention further contemplates the delivery of a quantity of the material for discharge through the nozzle in dust form at a rate commensurate with the speed of the vehicle; and an independently controlled force for causing the material to be discharged through the nozzle at a rate of speed and with such force as desired, without regard to the speed of the vehicle.

Another object contemplated by this invention is the production of a pivoted nozzle adapted for directing the discharge of the powdered material at different angles from the direction of travel of the vehicle on which the apparatus is mounted; while still another object is the provision of a nozzle that is pivoted for horizontal movement and otherwise associated with the vehicle so that it is caused to move about its pivot at a speed commensurate with the advancing speed of the vehicle, and such a nozzle having means associated therewith to permit its vertical adjustment.

Other objects and advantages will become apparent from the following specification when considered in connection with the accompanying drawings, wherein, Figure 1 illustrates an embodiment of the invention applied to a vehicle of the horse drawn type, the vehicle being illustrated conventionally;

Fig. 2 illustrates a transverse sectional view through the structure shown in Figure 1; on line 2—2;

Fig. 3 is a sectional view through the feed valve casing;

Fig. 4 is a top plan view of the structure disclosed in Fig. 1;

Fig. 5 is a view of the structure illustrated in Fig. 1 as it appears from the opposite side;

Fig. 6 is a detailed view of the pivoted nozzle;

Fig. 7 illustrates one part of the lever mechanism for oscillating the pivoted nozzle;

Fig. 8 illustrates another part of the nozzle operating mechanism;

Fig. 9 is an enlarged sectional view through the hopper and valve mechanism; and Fig. 10 is a detailed view taken on line 10—10 of Fig. 5.

Now referring to the drawings in detail, the numeral 1 designates the frame of a vehicle of the horse-drawn type, having fork members 2 and 3 arranged so that they extend downwardly therefrom. The fork members 2 and 3 are adapted to accommodate the ground wheels 4 and 5 respectively, which wheels are mounted in the usual way upon axles arranged with the fork members.

Each of the fork members 2 and 3 is securely held perpendicular to the frame by means of a brace 6 which extends to the rear of the vehicle, a forwardly extending brace 7, and the inwardly inclined brace 8, all of the braces for each fork member being attached at their adjacent ends to the inner prong of the particular form member. By arranging the inwardly extending braces 8 so that they are but slightly inclined from the vertical plane, the vehicle can be readily drawn over rows of vegetation without in any way destroying or injuring the same, for in such a construction there is no part of the vehicle below the frame, between the inwardly inclined braces. Furthermore, in the preferred form of the invention the fork members, or one of them, and the braces therefor are mounted on the frame 1 in such a manner that they may be adjusted transversely to vary the space between the wheels in accordance with the spacing of the rows which are to be straddled. This may be accomplished, for example, by providing slotted bolt holes, or by a series of suitably spaced holes in the frame 1 at the points of attachment, as illustrated in connection with the fork for wheel 5, in Figure 4.

Attached to the ground wheel 4 for rotation therewith is a sprocket 9, over which a sprocket chain 10 is passed, said sprocket chain also passing over a sprocket 11 which is freely mounted on a shaft 12. The sprocket 11 may be suitably mounted on the shaft 12 to prevent longitudinal movement and to maintain its alignment with the sprocket 9. The shaft 12 is arranged above the frame 1 and extends horizontally there-across with one end thereof journaled in a bearing 13 arranged adjacent the free sprocket 11. A clutch member 14 keyed upon the shaft 12 is adapted to be moved longitudinally along the shaft by means of a lever 15, while a similar clutch member 16 for cooperating with the clutch member 14 is secured to the sprocket 11. It will be readily apparent from the structure thus far described, that movement of the vehicle over the ground causes the rotation of the sprocket 9 through the medium of the ground wheel 4, and that such motion is transmitted to the shaft 12 when the clutch members 14 and 16 are in engagement. The shaft 12 is journaled in a bearing at the end spaced from the bearing 13 and has keyed thereto intermediate of these bearings a sprocket 17.

A hopper 18 is vertically supported upon the frame 1 at the rear thereof, and the powdered material which is to be distributed is placed in this hopper and is fed therefrom during operation of the mechanism which I will now describe. The hopper 18 has arranged therein an agitator 19, which agitator is formed by means of a central shaft 20 having spiders 21, 22 and 23 secured thereto. The legs of the spiders may be arranged in the same plane, or the legs of the spider 21 may be somewhat in advance of the legs of the spider 22 and, in turn the legs of the spider 22 proportionately in advance of the legs of the spider 23 so that an agitator bar 24 can be secured in each of the legs of the spiders, and the bar therefore being angularly arranged with respect to the shaft 20 will cause the material to be fed to one side of the hopper as well as prevent the formation of arches in the material. The ends of the shaft 20 extend through bearings in the side walls of the hopper 18, and that end of the shaft which is adjacent to the sprocket 17 has a sprocket 25 secured thereon. The hopper has a rounded bottom wall 26 which causes the material therein to be directed to the lowermost part thereof, wherein an elongated opening 27 is provided at the side thereof toward which the bars 24 cause the material to be fed, and this opening is adapted to be closed to a desired degree by means of an adjustable plate 28, which plate can be readily adjusted to the desired position by means of the handle 29.

A casing 30 is arranged directly under the opening 27 of the hopper 18, and this casing contains a rotary valve member 31. The valve member 31 is formed with a body 32 and outwardly extending ribs 33. The valve member 31 is mounted on a shaft 34 journaled in bearings 35, 36 and 37, and is adapted to be rotated by means of this shaft 34.

The shaft 34 has keyed to the outer end thereof a sprocket 38, which sprocket is in the same plane with sprockets 17 and 25, and a sprocket chain 39 is mounted for cooperation with these sprockets by passing over each of the same. A slack take-up sprocket 40 is arranged adjacent the sprocket 38 for permitting an adjustment of the sprocket chain 39.

It will be seen that upon the operation of the shaft 12 as previously described, the sprockets 25 and 38 will be caused to rotate through the medium of sprocket 17 and sprocket chain 39, whereupon the agitator 19 will be set in motion as well as the feed valve member 31. As this mechanism is operated, the material is fed downwardly through the opening 27, and as the valve 31 rotates this material settles downwardly between the ribs thereof, whereupon the further rotation of the valve member causes the material to be deposited downwardly into the lower portion of the casing 30. A brush 41 is arranged in the lower portion of the casing 30 and vertically adjustable to compensate for wear. The bristles thereof contact with the valve member 31 to assist in causing the material being fed by the valve to be entirely removed therefrom, so that the space between the ribs of the valve will be emptied and receive a full charge of the powdered material when this space is again brought under the opening 27 of the hopper 18. The subject matter of this feeding mechanism is described and claimed broadly in application Serial No. 279,044, copending herewith.

An internal combustion engine 42, or other source of power independent of the ground wheels of the vehicle, is mounted upon the frame 1 to the right and somewhat in advance of the hopper 18, and the shaft 43 of the internal combustion engine 42 has keyed thereto a sprocket 44. A friction clutch 44ᵃ is preferably interposed to permit starting with no load. A sprocket chain 45 passes over the sprocket 44 and extends rearwardly to a point where it passes over another sprocket 46. The sprocket 46 is mounted upon a shaft 47 which extends into a housing 48, wherein step-up gearing is provided for rotating a shaft 49. The shaft 49 is journaled in a bearing 50 and extends inwardly therefrom into a fan casing 51. This fan casing 51 is preferably made in sections so that it can be separated to permit the replacement or adjustment of parts, and has arranged within the same a fan 52 which causes a discharge from the casing through a tangential outlet passage 53. The casing 51 opposite the bearing 50 is provided with a central opening 54, which is in direct communication with the valve casing 30, the two casings 30 and 51 being connected by the conduit 55. It will be evident that upon the delivery of a powdered material from the hopper 18 into the valve casing 30 as described, that the fan 52 will create a suction through the casing 30 and cause the powdered material to be drawn into the casing 51, whereupon it will be violently blown through the passage 53. At this point it is well to note that the internal combustion engine 42 may be driven at a varying or constant speed as desired, and that it is operated independent of the speed of the vehicle, so that regardless of the amount of material that is fed from the hopper through the medium of the valve 31, a constant violent discharge of the material may be had.

The casing 51 at the outer end of the passage 53 is provided with a flange 54′ and a flange 55′ of a separate casing 56 is bolted thereto so that the casing 56 provides an extension for the passage 53. The casing 56 is enlarged at its outer end into an inverted cup-shaped portion 57, this portion 57 having an opening 58 at the extreme end thereof. A casing 59 having a portion also of the inverted cup-shaped type is adapted to be placed over the portion 57 of the casing 56 in such a relation that it is movable thereover, the lower edge of the casing 59 resting upon washers 60 which, in turn, are supported by a flange 61 of the casing 56. Arranged centrally of the cup-shaped portion 57 and extending therethrough is a shaft 62, which shaft extends through a bearing 63 in the lower wall of the casing 56. The upper end of the shaft 62 extends through an enlarged portion 64 of the casing 59 and the shaft is bifurcated at this point for the reception of a key 65, which key extends across the shaft 62 and into slots 66 in the portion 64 of the casing 59. The lower end of the shaft 62 which extends through the bearing 63, has clamped thereto a crank 67 to which is pivoted a link 68. Another link 69 is pivotally secured to an upright on the hopper 18 and extends across the rear of the hopper to a point where it connects with the link 68. At a point adjacent the connection between the links 68 and 69, a connecting rod 70 is attached to the link 69 by means of a pivot pin 71. This connecting rod is secured at its other end to the crank 72 which is keyed to the end of the shaft 20 opposite to the sprocket 25. When the agitator 19 in the hopper 18 is rotated as previously described, the crank 72 will be moved and cause the connecting rod 70 to reciprocate, thereby transmitting an oscillating motion to the link 68 which, in turn, causes an oscillation to the shaft 62. As the shaft 62 is keyed to the casing 59, this casing will also oscillate and the extension 73 thereof to which the nozzle 74 is attached will likewise be caused to oscillate.

The nozzle 74 is secured to the extension 73 at the end thereof and is preferably formed of spirally wound metal at one portion thereof, so that this portion will be flexible. A sleeve 75 is secured at the outer end of the nozzle 74 to lend rigidity thereto at this point, and a bar 76 is pivotally connected to the lower end of the sleeve 75. Arranged at the end of the extension 73 and secured thereto by means of a bolt 77, which bolt is employed also for the purpose of aiding in securing the nozzle 74 and the extension 73 together, is a downwardly extending rigid bar 78. The end of the bar 78 has secured therein a clamping bolt 79, which cooperates with an elongated slot 80 in the bar 76. It will be seen, therefore, that by adjusting the bar 76 with respect to the rigid bar 78, the flexible portion of the nozzle 74 will be bent upwardly or downwardly as desired, so that the material being discharged from the nozzle can be directed upon the taller vegetation, as well as upon such vegetation as does not normally extend far above the ground.

From the foregoing description, it will be readily seen that the amount of material which is fed from the hopper to be discharged through the nozzle is proportionate to the amount of ground over which the vehicle passes, as the valve mechanism as well as the agitator is under the direct control of the ground wheels of the vehicle. It will be clear that the oscillation of the nozzle is controlled by the ground wheel which also causes the nozzle to completely oscillate according to a desired advance of the vehicle over the ground. By this arrangement, the material which is discharged from the nozzle, should it be discharged slowly, would be deposited upon the ground in a serpentine path. Thus far it will appear that the amount of the material and the general direction of its discharge are controlled by the movement of the vehicle over the ground; but in use, where an even distribution of the material is to be had, a more or less violent discharge of the material is produced by a separate means independent of the control of the ground wheel, which means in the present case is illustrated as an internal combustion engine 42.

The present invention is particularly suited for use in connection with dust insecticides having therein adhesives of a gelatinous nature. Therefore, particularly in connection with such material and also, in some instances, in connection with other powders, it is desirable to keep the material in a dry state until it is discharged from the nozzle, and therefore a hot air conduit 81 which leads from the internal combustion engine to the conduit 55 is provided, for drying moisture, and, in fact, for keeping moist air, which may be drawn into the conduit 55 by the fan 52, from affecting the material.

It is, of course, understood that the invention is not limited to the exact apparatus disclosed in the drawings, as it will be obvious to those skilled in the art that various changes may be made in the machine without departing from the spirit of the invention.

What we claim is:

1. In a device for distributing finely divided material, means for feeding measured amounts of material, means for forcibly discharging said material and means for directing said discharge, the directing means and the feeding means being controlled by the travel of the device and the means for forcibly discharging being independently controlled.

2. In a device for distributing finely divided material, means for containing a supply of said material, means operable by the movement of said device to feed measured amounts of material from the container, means for creating a blast of air by said feeding means, an internal combustion engine for driving said means, means for utilizing the heat of said engine to dry the air in said blast, and adjustable means for directing the discharge of said blast with its entrained material, said directing means being pivotally mounted and means controlled by the travel of said device for moving said directing means about its pivot.

3. In a device of the class described, a conduit, a pivot mounted therein, a nozzle mounted on said pivot and means for rotating the nozzle on the pivot, the nozzle and the conduit having cooperating annular surfaces coaxial with the pivot, and the nozzle having a flexible portion adjacent its opposite end and means for adjusting said flexible portion.

4. In a device of the class described, a conduit, a pivot mounted therein, said conduit having an annular face coaxial therewith, a nozzle secured to said pivot and having an annular face adapted to cooperate with the face on said conduit, a flexible portion adjacent its opposite end and means for adjusting said flexible portion.

5. A device for distributing finely divided material including a container for the material, and a nozzle comprising a conduit through which the material to be discharged is passed, said conduit being provided with an inverted cup-shaped portion fitting over and pivotally connected to a similar shaped portion of another conduit, said nozzle directing the discharge of the material and being adapted to be rotated as the result of the movement of the conduit about its pivotal connection with the second mentioned conduit.

6. A device for distributing finely divided material including a container for the material, and a nozzle comprising a conduit having an inverted cup-shaped portion fitting upon and pivotally connected to another conduit, said nozzle directing the discharge of the material and being adapted to be oscillated as the result of the movement of the conduit about its pivotal connection with the second mentioned conduit, and means for causing the oscillation of the first conduit and the nozzle.

7. A device for distributing finely divided material including a container for the material provided with an opening through which the material is adapted to be discharged, a tubular housing communicating with the container and positioned so that the material discharged from the container will pass directly thereinto, a fan casing in communication with said housing having a fan therein, a conduit connecting the fan-casing with the housing, an angularly disposed inverted cup-shaped portion arranged adjacent the outer end of said conduit opened in its side wall adjacent its extreme end, a nozzle comprising a second conduit provided with an inverted cup-shaped portion fitting over the cup-shaped portion on the first mentioned conduit and having the longitudinal opening thereof in communication with the opening in the end of the first mentioned conduit, the two conduits being substantially sealed together with the second conduit mounted for oscillation, an angularly disposed shaft extending downwardly from the bottoms of the inverted cup-shaped members but perpendicular thereto through a bearing arranged in the bottom of the first mentioned conduit, the second mentioned conduit being keyed at its upper end to said shaft and the shaft being provided on its lower extension with a crank arm, a bar pivoted to the main frame of the device and being attached to the outer end of said crank by means of a link, and means for causing the movement of the bar about its pivot to effect oscillation thereof which in turn causes oscillation of the nozzle as the result of oscillation of said shaft for directing the discharge of the material.

8. In a device for distributing finely divided material, a hopper for the material to be distributed provided with an opening through which the material is adapted to be discharged, feeding means adjacent the opening in the hopper for causing a feeding of the material therefrom, means for creating a current of air and means for directing the current of air around the feeding means whereby some material will be dislodged from the feeding means and entrained in the air while some of the material will be entrained in the air immediately as it falls free of the feeding means before there is any tendency of a bulk of the material being collected in the path of the current of air.

9. In a portable device for distributing finely divided material, a container for the material, an oscillating nozzle through which the material is adapted to be discharged upon the ground being traversed, means for regulating the speed of oscillation of the nozzle according to the movement of the device over the ground, and means for creating a blast of air effecting discharge of the material through the nozzle, the means for creating the blast of air being controlled independently of the ground traversed by the device.

10. In a device for distributing finely divided material, a hopper for the material to be distributed, said hopper being provided with an opening, rotating means positioned adjacent the opening for feeding and regulating the amount of material discharged through the same, means for creating a current of air, means for directing the current of air transversely under the opening to effect entrainment of the material being discharged from the hopper, a nozzle through which the mixture of material and air is discharged, and means associated with the nozzle to oscillate the same, said means being characterized by the fact that oscillation of the nozzle will be at a speed constant with respect to the speed of rotation of the feeding means, while the means for creating the blast of air can be moved at a speed independent of the speed of rotation of the feeding means and independent of the speed of oscillation of the nozzle.

11. In a device for distributing finely divided material, a hopper for the material to be distributed, said hopper being provided with an opening, means positioned adjacent the opening for effecting predetermined discharge of the material through the opening, means for creating a current of air under the opening to effect entrainment of the material being discharged from the hopper, a nozzle through which the mixture of material and air is discharged, and an operative connection between the nozzle and the means for effecting a predetermined discharge of material for causing oscillation of the nozzle, said nozzle being oscillated through the medium of the operative connection at a speed predetermined with respect to the amount of material being discharged from the hopper, whereby a uniform discharge of the material over a given space will be had, while the current of air being of a volume independent of the amount of material discharged from the hopper is capable of causing the material to be discharged in a finely divided condition in the air regardless of the amount of material being discharged from the hopper.

12. In a device for distributing finely divided material, means for feeding measured amounts of material, means for forcibly discharging said material, means for directing said discharge, the feeding means being controlled by the travel of the device and the means for forcibly discharging being independently controlled, and adjustable means to alter the measured amounts fed by the feeding means.

13. In a device for distributing finely divided material, means for feeding measured amounts of material, means for forcibly discharging said material, movable means for directing said discharge, the directing means and the feeding means being controlled by the travel of the device and the means for forcibly discharging being independently controlled and adjustable means for varying the amount of material fed by the feeding means to effect the feeding of predetermined amounts varied with respect to the movement of the directing means.

In testimony whereof we affix our signatures.

EDGAR KNAPP.
CARL G. ALLGRUNN.